(12) United States Patent
Skovgaard Christensen et al.

(10) Patent No.: US 11,080,546 B2
(45) Date of Patent: Aug. 3, 2021

(54) METHOD AND SYSTEM FOR FINGERPRINT IMAGE ENHANCEMENT

(71) Applicant: Fingerprint Cards AB, Gothenburg (SE)

(72) Inventors: Søren Skovgaard Christensen, Dyssegaard (DK); Morten With Pedersen, Frederiksberg (DK)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 16/753,762

(22) PCT Filed: Oct. 2, 2018

(86) PCT No.: PCT/SE2018/051008
§ 371 (c)(1),
(2) Date: Apr. 4, 2020

(87) PCT Pub. No.: WO2019/074423
PCT Pub. Date: Apr. 18, 2019

(65) Prior Publication Data
US 2020/0285882 A1    Sep. 10, 2020

(30) Foreign Application Priority Data
Oct. 13, 2017    (SE) .................................... 1751271-6

(51) Int. Cl.
*G06K 9/40*     (2006.01)
*G06K 9/00*     (2006.01)

(52) U.S. Cl.
CPC .............. *G06K 9/40* (2013.01); *G06K 9/0002* (2013.01); *G06K 9/00926* (2013.01)

(58) Field of Classification Search
CPC ........... G06K 9/0006–9/0012; G06K 9/00067; G06K 9/40
See application file for complete search history.

(56) References Cited

U.S. PATENT DOCUMENTS

| 5,602,934 A | 2/1997 | Li et al. |
| 2002/0047908 A1 | 4/2002 | Mise et al. |

(Continued)

FOREIGN PATENT DOCUMENTS

| CN | 102103692 A | 6/2011 |
| CN | 104715459 A | 6/2015 |

(Continued)

OTHER PUBLICATIONS

International Search Report and Written Opinion for International Application No. PCT/SE2018/051008 dated Dec. 7, 2018, 9 pages.

(Continued)

*Primary Examiner* — Brian Werner
(74) *Attorney, Agent, or Firm* — RMCK Law Group, PLC

(57) ABSTRACT

The present disclosure relates a method for fingerprint image enhancement comprising applying a first low pass filter and a first weight to raw fingerprint image data to produce a first filtered fingerprint image data set. Applying a second low pass filter and a second weight to the raw fingerprint image data to produce a second filtered fingerprint image data set. Filter coefficients of the second filter are different from filter coefficients of the first filter. The first filtered fingerprint image data set and the second filtered fingerprint image data set are combined to produce a final enhanced fingerprint image. The disclosure also relates to a fingerprint sensing system and to an electronic device comprising a fingerprint sensing system.

16 Claims, 8 Drawing Sheets

(56) References Cited

U.S. PATENT DOCUMENTS

| | | | |
|---|---|---|---|
| 2002/0146178 A1 | 10/2002 | Bolle et al. | |
| 2003/0112374 A1* | 6/2003 | Wang | H04N 5/208 348/625 |
| 2016/0307023 A1 | 10/2016 | Kim et al. | |
| 2017/0070718 A1* | 3/2017 | Baqai | H04N 5/217 |
| 2018/0005031 A1* | 1/2018 | Chen | G06K 9/00087 |

FOREIGN PATENT DOCUMENTS

| | | | |
|---|---|---|---|
| EP | 1975871 A2 | 10/2008 | |
| EP | 1975871 A3 | 12/2008 | |
| EP | 2026586 A1 | 2/2009 | |
| EP | 3093794 A1 | 11/2016 | |
| WO | 03079274 A1 | 9/2003 | |

OTHER PUBLICATIONS

Di, S., et al. "A Fingerprint Authentication System Based on Mobile Phone" Audio- and -Video-Based Biometric Person Authentication; vol. 3546, pp. 151-159 (2005).
Sherlock, B G., et al., "Fingerprint enhancement by directional Fourier filtering" IEE Proceedings: Vision, Image and Signal Process, 19940401, Institution of Electrical Engineers, vol. 141, Nr 2, pp. 87-94 (Apr. 1994).
Extended European Search Report dated Oct. 30, 2020 for European Patent Application No. 18865664.9, 6 pages.

* cited by examiner

METHOD AND SYSTEM FOR FINGERPRINT IMAGE ENHANCEMENT

CROSS-REFERENCE TO RELATED APPLICATIONS

This application is a 371 U.S. National Stage of International Application No. PCT/SE2018/051008, filed Oct. 2, 2018, which claims priority to Swedish Patent Application No. 1751271-6, filed Oct. 13, 2017. The disclosures of each of the above applications are incorporated herein by reference in their entirety.

FIELD OF THE INVENTION

The present invention relates to a method for fingerprint image enhancement. The present invention further relates to a fingerprint sensing system and to an electronic device comprising the fingerprint sensing system.

BACKGROUND OF THE INVENTION

Various types of biometric systems are used more and more in order to provide for increased security and/or enhanced user convenience.
In particular, fingerprint sensing systems have been adopted in, for example, consumer electronic devices, thanks to their small form factor, high performance and user acceptance.

Fingerprint sensors are generally comprised of a pixel matrix which is configured to sense the fingerprint pattern of a finger. Signals from each of the pixel elements are collected and subsequently processed to form a fingerprint image. Ideally, the final fingerprint image is a low noise high resolution fingerprint image which can be used for fingerprint recognition applications and that can be acquired relatively fast.

However, the raw fingerprint images captured by a fingerprint sensor are typically distorted in different ways. For example, the raw fingerprint images may be blurred, non-uniform, or contain noise from various sources such as from gain stages in analog circuitry of the fingerprint sensor.

Blur in fingerprint images may be caused by variations in the electric field between the finger and the fingerprint sensor area. U.S. Pat. No. 9,235,283 discloses an example of a finger biometric sensor that includes de-blurring circuitry to mitigate blur distortions in fingerprint images. Generally, de-blurring is performed by attempting to invert the effects of the varying electric field using different model functions. One downside is that de-blurring may cause artifacts in other parts of the image.

However, blurring is only one of several distortions that affect the quality in fingerprint images, thus further improvements in fingerprint image quality is still possible.

SUMMARY

In view of above-mentioned and other drawbacks of the prior art, it is an object of the present invention to provide a method for fingerprint image enhancement to provide fingerprint images with improved quality.

According to a first aspect of the present invention, there is provided a method for fingerprint image enhancement, the method comprising: retrieving raw fingerprint image data captured by a fingerprint sensor device; applying a first low pass filter and a first weight to the raw fingerprint image data to produce a first filtered fingerprint image data set, the first low pass filter comprising at least one set of filter coefficients, applying a second low pass filter and a second weight to the raw fingerprint image data to produce a second filtered fingerprint image data set, the second low pass filter comprising at least one set of filter coefficients, wherein the set of filter coefficients of the second filter is different from the set of filter coefficients of the first filter, combining the first filtered fingerprint image data set and the second filtered fingerprint image data set to produce a final enhanced fingerprint image.

The present invention is based upon the realization to apply at least two low pass filters and two weights separately to the raw fingerprint image data in order to obtain at least two distinguished filtered sets of fingerprint image data. The filtered sets of fingerprint image data are combined to produce an enhanced fingerprint image. In this way it is possible to deal with e.g. non-uniformity in fingerprint images and produce sharper images with improved performance for fingerprint recognition applications.

Accordingly, the present invention may particularly provide for enhanced fingerprint images with reduced non-uniformity, and possibly less noise and improved sharpness compared to prior art methods. Consequently, improved fingerprint recognition performance may be possible.

That the set of filter coefficients of the second filter is different from the set of filter coefficients of the first filter may be that at least one filter coefficient differs between the sets of filter coefficients.

"Retrieving raw fingerprint image data" includes retrieving previously captured raw fingerprint image data. However, it may also include capturing the raw fingerprint image data and use it for producing a final enhanced fingerprint image.

Raw fingerprint image data is the data captured by the fingerprint sensor and that preferably has not undergone any processing which affect the image quality. The raw fingerprint image data may be structured as a two-dimensional matrix of data points from the pixels of the fingerprint sensor. The data points from the pixels may be intensity values in the resulting fingerprint image.

Combining the first filtered fingerprint image data set and the second filtered fingerprint image data set may include to sum the data sets together in a point by point manner. For example, if the filtered data sets are structured as matrices of filtered data, the matrices may be summed to produce fingerprint image data for the final enhanced fingerprint image. In other words, combining the first filtered fingerprint image data set and the second filtered fingerprint image data may be a pixel-wise summation of intensity values from fingerprint image data sets.

The low pass filters may be spatial low pass filters applied across the 2-dimensional fingerprint image data. The low pass filter may be represented by a function describing a "curve" if shown as a graph in case of a 1-dimensional filter or a function describing a "surface" if shown as a graph in case of a 2-dimensional filter. The shapes of the curve or the surface are defined by the filter coefficients which thereby define the properties of the low pass filter.

Furthermore, a discrete representation of a low pass filter may be provided in the form of a matrix comprising the filter coefficients.

In some embodiments, the filters are Gaussian filters. A Gaussian filter has a response function in the form of a Gaussian function. Gaussian filters are per se known to the skilled person. In relation to the above, the filter coefficients for a Gaussian filter may be derived from the Gaussian function. A 2-dimensional Gaussian function defines the shape of the "surface" in the 2-dimensional case and 1-dimensional Gaussian function defines the shape of the "curve" in the 1-dimensional case.

In case of applying Gaussian filters, the filter coefficients for each filter are defined by the Gaussian function and may be controlled by a single parameter in terms of the standard deviation. One standard deviation is chosen for the first filter and another standard deviation is chosen for the second filter. Accordingly, the filter coefficients of the two filters are different.

According to embodiments of the invention, the first weight may be different from the second weight. In other words, different weights may be applied to produce the filtered fingerprint image data sets. By choosing the weights appropriately, this advantageously provides for further improved quality of the final enhanced fingerprint image such as e.g. a shaper image, an image with less noise, and/or improved uniformity of the final enhanced fingerprint image.

The weights may be either a positive number or a negative number and is advantageously applied by multiplying the weight with the respective filtered fingerprint image data.

In one embodiment a plurality of low pass filters and weights may be applied to the raw fingerprint image data to produce a plurality of filtered fingerprint image data sets, wherein the plurality of filtered fingerprint data sets are combined to produce the final enhanced fingerprint image. Thus, the raw fingerprint image data set may be passed through a bank of low-pass filters and weights. With additional low-pass filters and weights it may be possible to improve the quality of the final enhanced fingerprint image even further.

According to embodiments of the invention, the method may include iteratively producing an updated final enhanced fingerprint image by repeating, for a multiple number of iterations, the application of low pass filters and weights to the final enhanced fingerprint image produced in the respective previous iteration. Accordingly, the final enhanced fingerprint image is fed back and used as input to the low pass filters as "raw" fingerprint image data in order to iteratively produce an updated final enhanced fingerprint image. The iteration may loop several times in order to produce a final enhanced fingerprint image with even further improved image quality.

When using the iterative procedure to produce the final enhanced fingerprint image the set of filter coefficients may be varied between iterations. For example, the first set of filter coefficients used in a first iteration may be varied to a third set of filter coefficients used in a subsequent iteration. Similarly, the second set of filter coefficients may be varied to a fourth set of filter coefficients between two iterations.

Additionally, when iterating to produce the final enhanced fingerprint image at least one of the weights may be varied between iterations.

The filter coefficients may be selected based on properties of the retrieved raw fingerprint image data. Such a selection is made in order to e.g. enhance the sharpness of the final enhanced fingerprint image or to improve the biometric performance, i.e. in order to improve the fingerprint recognition performance using the final enhanced fingerprint image as a verification image in a fingerprint authentication procedure.

The selection of filter coefficients may be made based on empirically determined selections from off-line machine learning about the resulting final enhanced fingerprint image from raw fingerprint image data and selections of filter coefficients. The selection may also be based on solving mathematical optimization problems with raw fingerprint image data as input and with desirable final enhanced fingerprint image as the target.

In a similar manner as with the above selection of filter coefficients, the weights may also be selected based on properties of the retrieved raw fingerprint image data. For example, the weights may be selected for obtaining the final enhanced fingerprint image with improved sharpness.

According to a second aspect of the present invention there is provided a fingerprint sensing system comprising: a fingerprint sensor device for acquiring fingerprint image data; and a control unit configured to perform the steps of any one of the above mentioned embodiments.

The fingerprint sensor may be a capacitive fingerprint sensor. Such a capacitive fingerprint sensor may comprise capacitive sensing elements, each providing a measure indicative of the capacitive coupling between that particular sensing element and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a fingerprint sensing device comprising sensing elements utilizing a particular fingerprint sensing technology, but are equally applicable to, for instance, optical, thermal, capacitive, acoustic/ultra-sound, or piezo-electric fingerprint sensors etc.

The fingerprint sensor device may comprise additional circuitry for operating on sensing signals indicative of the fingerprint pattern provided by the sensing elements. Such additional circuitry, may for instance include sampling circuitry and analog-to-digital conversion circuitry. Thus, the fingerprint sensor may thus provide a fingerprint pattern signal as a digital signal. Alternatively, the fingerprint pattern signal may be provided as an analog signal. For example, the signals may be analog or digital values indicative of a voltage, which may in turn be proportional to the capacitance of the capacitor constituted by the finger (or other conductive object in the vicinity of the finger detecting structure), the finger detecting structure and the dielectric material there between.

The sensed fingerprint pattern may be used for various purposes, such as biometric enrollment or authentication, or fingerprint pattern based navigation etc.

Further embodiments of, and effects obtained through this second aspect of the present invention are largely analogous to those described above for the first aspect of the invention.

There is further provided an electronic device, comprising: a fingerprint sensing system; wherein the control unit is configured to: provide an authentication request for a finger to the fingerprint sensing system; receive the authentication signal from the fingerprint sensing system; and perform at least one action if the authentication signal indicates authentication success.

The electronic device may be a mobile device (e.g. a mobile phone), a smart card, a tablet, or a laptop, or a desktop computer or any other present or future suitable electronic device comprising a fingerprint sensor.

There is further provided a computer program product comprising a computer readable medium having stored thereon computer program means for controlling an electronic device, the electronic device comprising a fingerprint sensor configured to acquire raw fingerprint image data, and a control unit configured to receive the raw fingerprint image data captured by the fingerprint sensor, wherein the computer program product comprises: code for applying a first low pass filter and a first weight to the raw fingerprint image data to produce a first filtered fingerprint image data set, the first low pass filter comprising at least one set of filter coefficients, code for applying a second low pass filter and a second weight to the raw fingerprint image data to produce a second filtered fingerprint image data set, the second low pass filter comprising at least one set of filter coefficients, wherein the set of filter coefficients of the second filter is different from the set of filter coefficients of the first filter, and code for combining the first filtered fingerprint image data set and the second filtered fingerprint image data set to produce a final enhanced fingerprint image.

In summary, the present invention relates a method for fingerprint image enhancement comprising applying a first low pass filter and a first weight to raw fingerprint image data to produce a first filtered fingerprint image data set. Applying a second low pass filter and a second weight to the raw fingerprint image data to produce a second filtered fingerprint image data set. Filter coefficients of the second filter are different from filter coefficients of the first filter. The first filtered fingerprint image data set and the second filtered fingerprint image data set are combined to produce a final enhanced fingerprint image. The invention also relates to a fingerprint sensing system and to an electronic device comprising a fingerprint sensing system.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing system and method according to the present invention are mainly described with reference to a mobile device having an integrated fingerprint sensing device. However, it should be noted that many other kinds of electronic devices may have such a fingerprint sensing device integrated, such as tablets, desktop computers, laptops, smart cards, etc.

Figure 1:
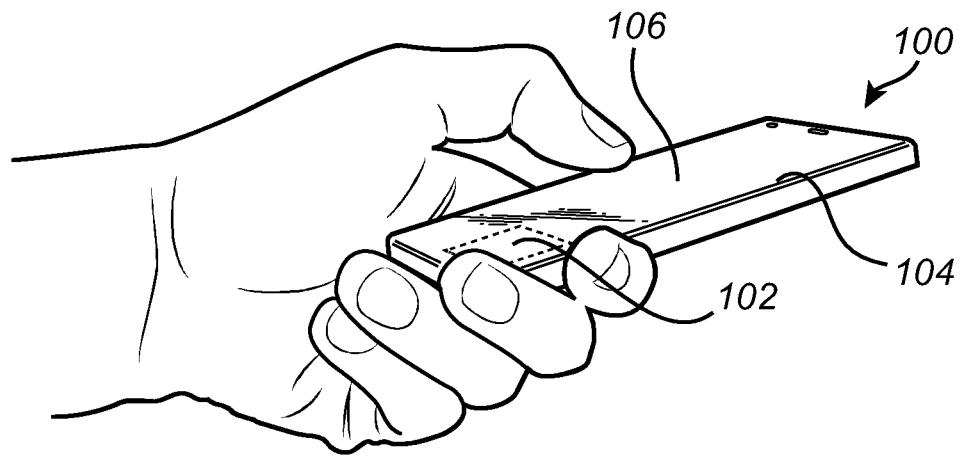
FIG. 1 schematically illustrates an electronic device according to an example embodiment of the present invention.

Turning now to the drawings and to FIG. 1 in particular, there is schematically illustrated an example of an electronic device configured to apply the concept according to the present disclosure, in the form of a mobile device 100 with an integrated fingerprint sensor 102 and a display unit 104 with a touch screen interface 106. In this embodiment the fingerprint sensor 102 is arranged on a front side of the mobile device 100, where also the display unit 104 is positioned. The fingerprint sensor 102 may, for example, be used for unlocking the mobile device 100 and/or for authorizing transactions carried out using the mobile device 100, etc. The fingerprint sensor 102 may of course also be placed on the back or on the side of the mobile device 100.

Preferably and as is apparent for the skilled person, the mobile device 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices, such as a laptop, a remote control, a tablet computer, smart card comprising a fingerprint sensor, or any other type of present or future similarly configured device, including any type of IoT (Internet of Things) devices where there is a desire to allow for user specific settings and/or identification/authentication of a user to be implemented.

In regards to all of the electronic devices such as the one shown in FIG. 1, the fingerprint sensor 102 is arranged in electrical or wireless communication with a control unit adapted for controlling the fingerprint sensor 102. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor 102.

Accordingly, the fingerprint sensing device 102 may be comprised in a fingerprint sensing system comprising a control unit (not shown). The control unit may be configured to execute the steps and functionality described with reference to FIGS. 3-8. The control unit may be part of a stand-alone fingerprint sensing system, or the control unit may be a control unit of the host electronic device, i.e. a device controller. Such a device controller may further be configured to provide an authentication request for a finger to the fingerprint sensing device 102. Such an authentication request may for example relate to requesting access to i.e. the electronic device or any other device employing a fingerprint sensor, or to authorize a transaction, etc. The control unit may subsequently receive the authentication signal from the fingerprint sensor device 102. If the authentication signal indicates authentication success at least one action may be performed.

Figure 2:
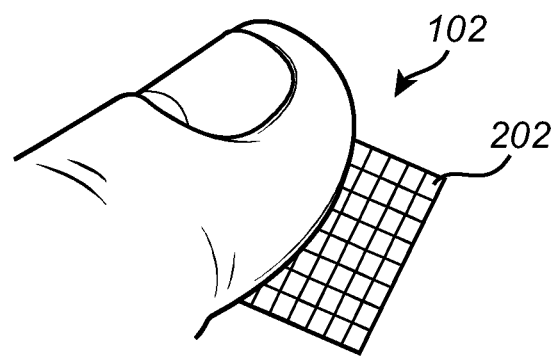
FIG. 2 schematically shows the fingerprint sensing device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figure 3:
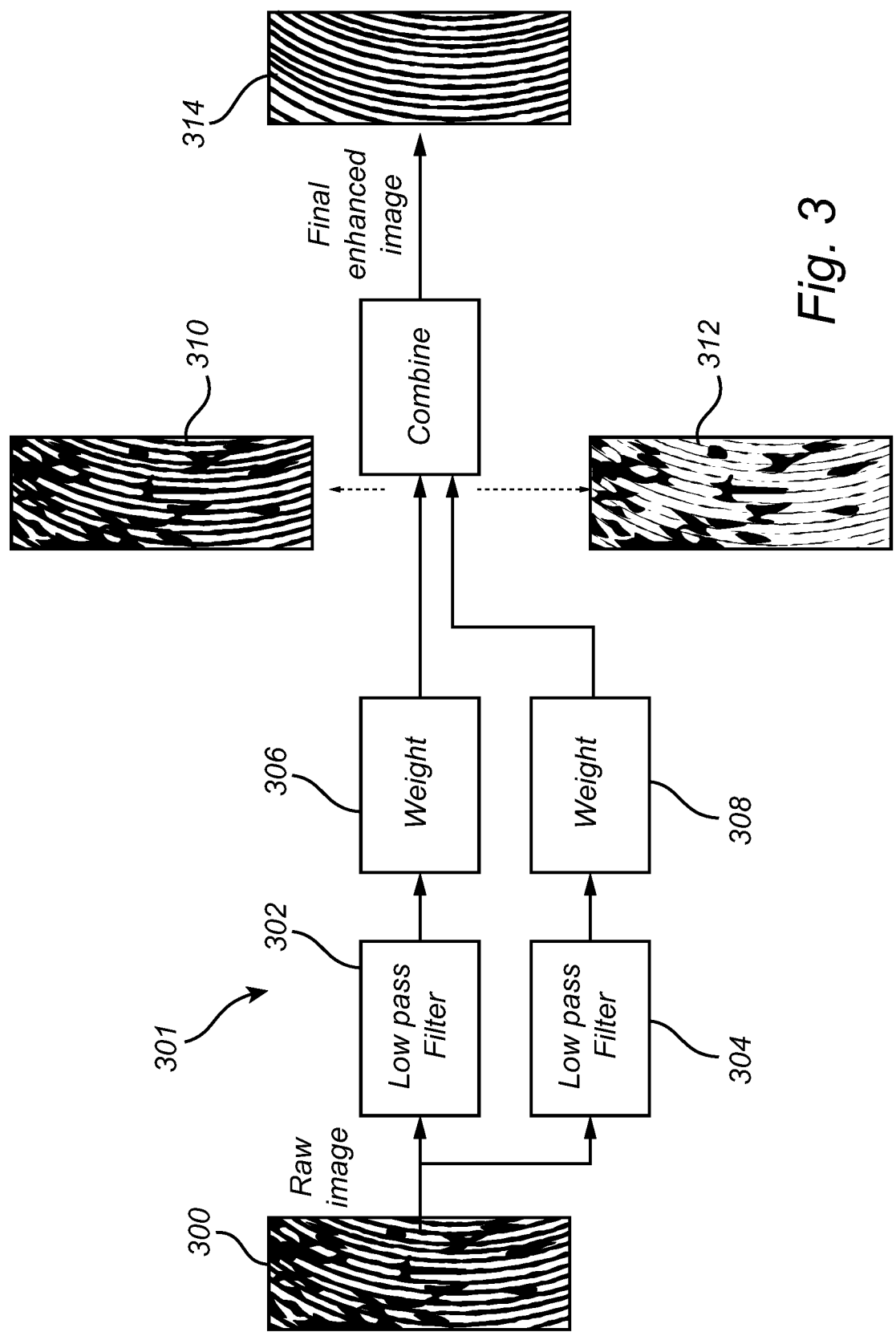
FIG. 3 conceptually illustrates embodiments of the invention for producing a final enhanced fingerprint image.

FIG. 3 conceptually illustrates embodiments of the invention for producing an enhanced fingerprint image from a raw fingerprint image 300. The raw fingerprint image 300 captured by a fingerprint sensing device is input to a bank 301 of low pass filters 302, 304 and weights 306, 308. The raw fingerprint image data 300 is passed through a first low-pass filter 302 and a first weight 306 to produce a first filtered fingerprint image data set 310. The first low-pass filter 302 comprises a first set of filter coefficients which describe the properties of the filter 302.

The raw fingerprint image data 300 is also passed through a second low-pass filter 304. Furthermore, a second weight 308 is applied to the raw fingerprint image data 300 to produce a second filtered fingerprint image data set 312. The first filtered fingerprint image data set 310 and the second filtered fingerprint image data set 312 are produced in parallel, i.e. the raw fingerprint image data 300 is input into two separate filters in parallel.

The second low-pass filter 304 comprises a second set of filter coefficients which are different from the first set of filter coefficients. In other words, the raw fingerprint image data is independently input into two different filters producing different output filtered fingerprint image data sets. Furthermore, in some embodiments the weights 306 and 308 are also different from each other. For example, the first weight 306 may be "−1", and the second weight 308 may be "1". The weight is multiplied with the respective filtered fingerprint image data set. Generally, the weights may be any positive or negative number.

Subsequently, the first filtered fingerprint image data set 310 and the second filtered fingerprint image data set 312 are combined to produce a final enhanced fingerprint image 314. Combining the filtered fingerprint image data 310, 312 may comprise to sum the filtered fingerprint image data 310, 312. The image data is generally represented by a matrix of image intensity values (e.g. form each pixel), and the summing of the image data is straight-forward operation to sum the matrices.

Figure 4:
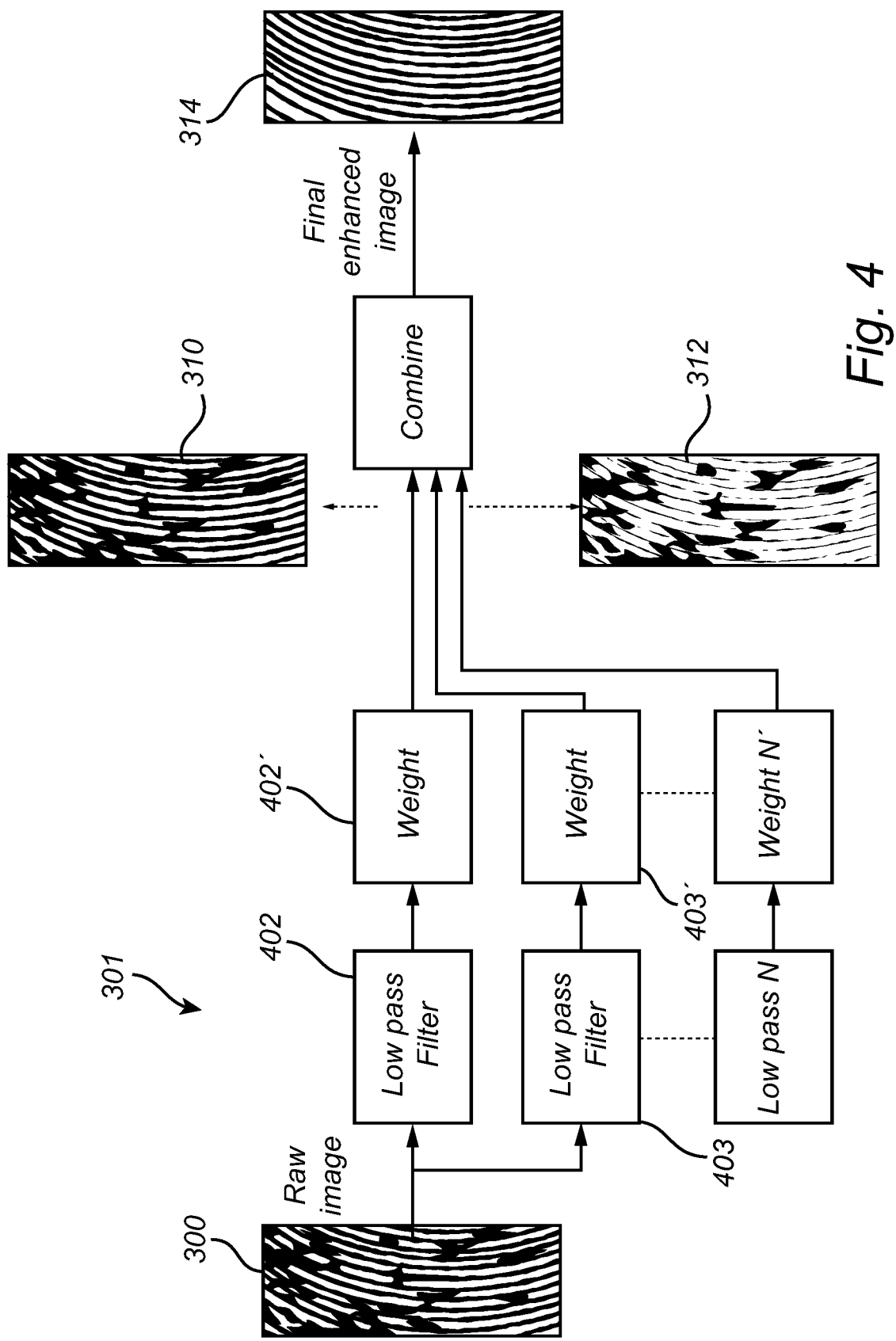
FIG. 4 conceptually illustrates embodiments of the invention for producing a final enhanced fingerprint image.

FIG. 4 conceptually illustrates a further embodiment of the invention where the filter bank is shown to comprise a plurality of low-pass filters and weights. The raw fingerprint image data 300 is input into each of the low pass filters (402-N) and weights (402'-N'). Thus, for each of the low-pass filter and weight set, a filtered fingerprint image data set is produced. In this conceptual illustration only two filtered fingerprint image data sets are illustrated, 310 and 312, but there is as mentioned one filtered fingerprint image data set produced from each of the pairs of low-pass filters (402-N) and weights (402'-N'). For example, if there are X number of low pass-filters (402-N) and thus X number of weights (402'-N'), there are consequently X number of filtered fingerprint image data sets that are subsequently combined to form the final enhanced fingerprint image 314.

Figure 5:
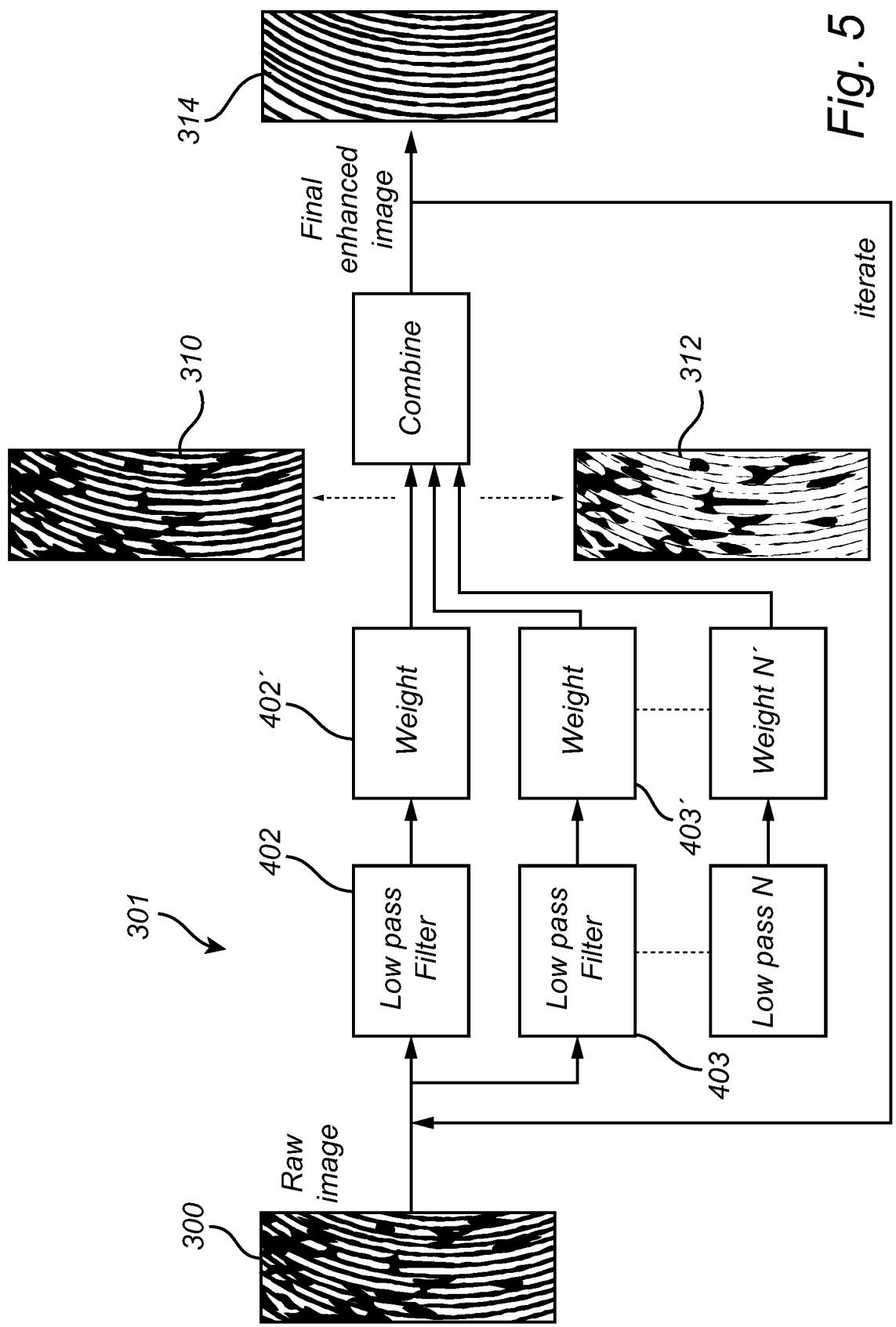
FIG. 5 conceptually illustrates embodiments of the invention for producing a final enhanced fingerprint image in an iterative manner.

FIG. 5 conceptually illustrates another example embodiment. The embodiment of FIG. 5 comprises the low-pass filters (402-N) and weights shown in FIG. 4. Furthermore, FIG. 5 includes an illustration of an iterative procedure to produce the final enhanced fingerprint image 314. Thus, for one or more iterations, the final enhanced fingerprint image produced after the combining of the plurality of filtered fingerprint image data sets is fed back as input to the bank of filters 301 comprising the low pass filters 402-N and the weights 402'-N'. The final enhanced fingerprint image 314 is thus passed through the low-pass filters 402-N and the weights 402'-N' to produce a new set of filtered fingerprint image data sets which are combined to form an updated final enhanced fingerprint image. The iteration procedure may be repeated a multiple number of times depending on for example properties of the raw fingerprint image data.

Furthermore, in the iterative procedure illustrated in FIG. 5, the set of filter coefficients and the weights may be varied between iterations. In some embodiments only one of the sets of filter coefficients and the weights may be varied between iterations. For example, weight 402' (or any other of the weights) may be varied between two iterations. Similarly, the set of filter coefficients of the low-pass filter 402 (or any other of the low-pass filters) may be varied between two iterations.

The filter coefficients are varied by choosing a new set of filter coefficients from a plurality of stored sets of filter coefficients. The filters are applied in a software based platform as is normally the case for image data filtering using e.g. Gaussian filters or other low-pass filters.

The low-pass filters of the present invention may be of various kinds of filter types, but in one possible implementation the low-pass filters are Gaussian filters. A Gaussian filter is generally characterized by a response function in the form of a Gaussian function having a standard deviation. In case of employing a Gaussian filter, the standard deviation is a filter property which may be selected which subsequently defines the set of filter coefficients via the Gaussian function.

Accordingly, the Gaussian function defines the set of filter coefficients. Gaussian filters are per se known to the skilled person and a Gaussian function (see also FIG. 6b) may in two dimensions mathematically be represented by:

$$G(x, y) = \frac{1}{\sqrt{2\pi}\,\sigma} e^{-\frac{x^2+y^2}{2\sigma^2}},$$

where σ is the standard deviation of the Gaussian function. For filtering of a fingerprint image, the Gaussian function with a standard deviation is applied the fingerprint image. Gaussian filtering may be implemented as a 2-dimensional kernel convoluted with the image to be filtered.

Another possibility is to apply a 1-dimensional filter in two directions across the fingerprint image. The 1-dimensional filter may for example first applied in the horizontal direction of the fingerprint image and then subsequently in the vertical direction of the image. It is of course also possible to first apply the 1D filter in the vertical direction and subsequently apply the 1D filter in the horizontal direction.

Figure 6A:
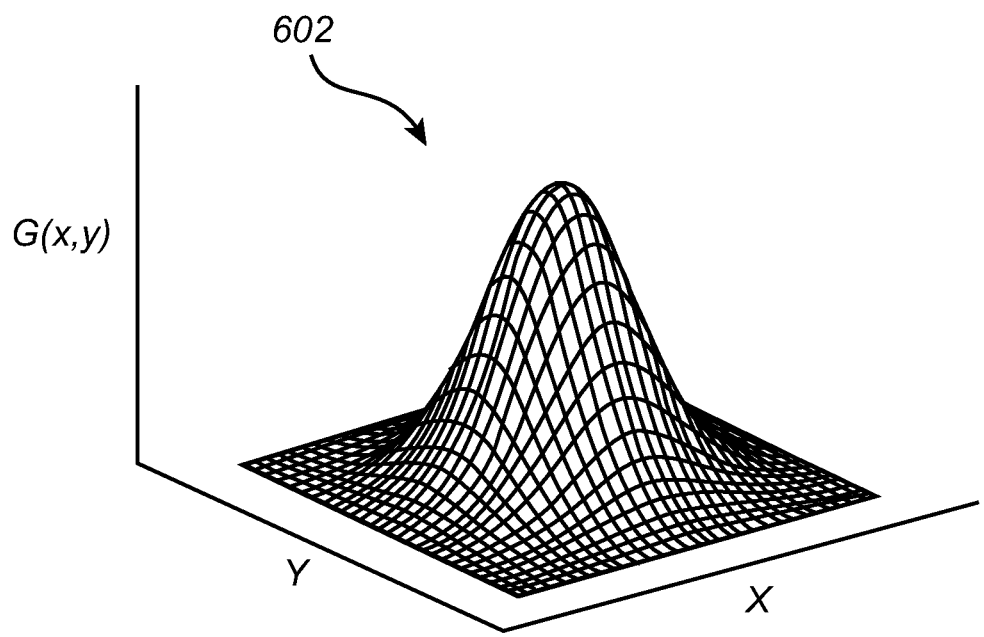
FIG. 6a conceptually illustrates a low pass filter function.
Figure 6B:
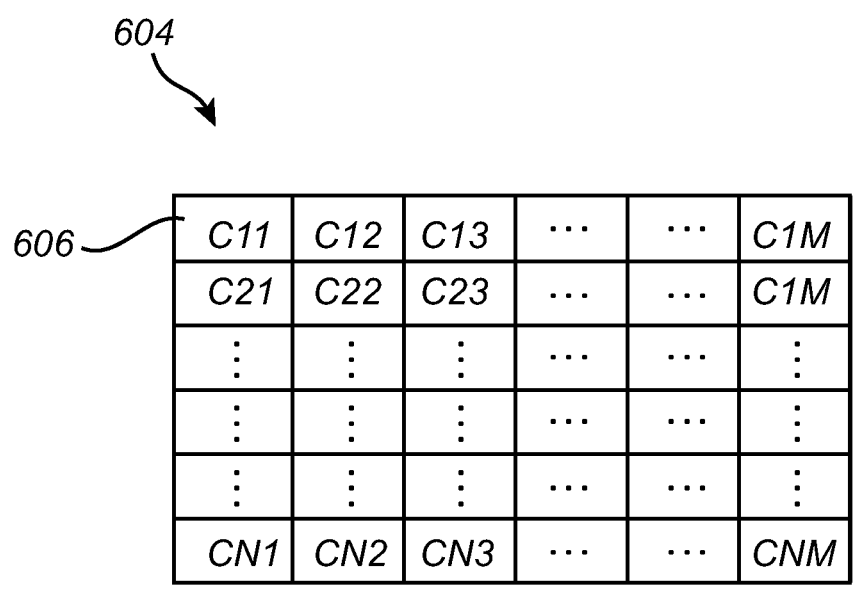
FIG. 6b conceptually illustrates a set of filter coefficients.

FIG. 6a conceptually illustrates a low-pass filter function 602 and FIG. 6b illustrates a set of filter coefficients in the form of a matrix 604 of filter coefficients 606 (only one is numbered). The low-pass filter function 602 may for example be a Gaussian function as described above.

The filter coefficients 606 conceptually shown in FIG. 6b may be derived from the low pass filter function 602, or the filter coefficients may be individually selected based on a desired image quality output. The number of filter coefficients may vary. For example, the matrix 604 may comprise 5×5, 7×7, 9×9, 12×12, or 15×15 filter coefficients just to mention a few examples. The matrix 604 does not necessarily have to be a square matrix. For a filtering operation the kernel, i.e. the matrix 604 of filter coefficients 606 is convoluted with the image data.

Figure 7:
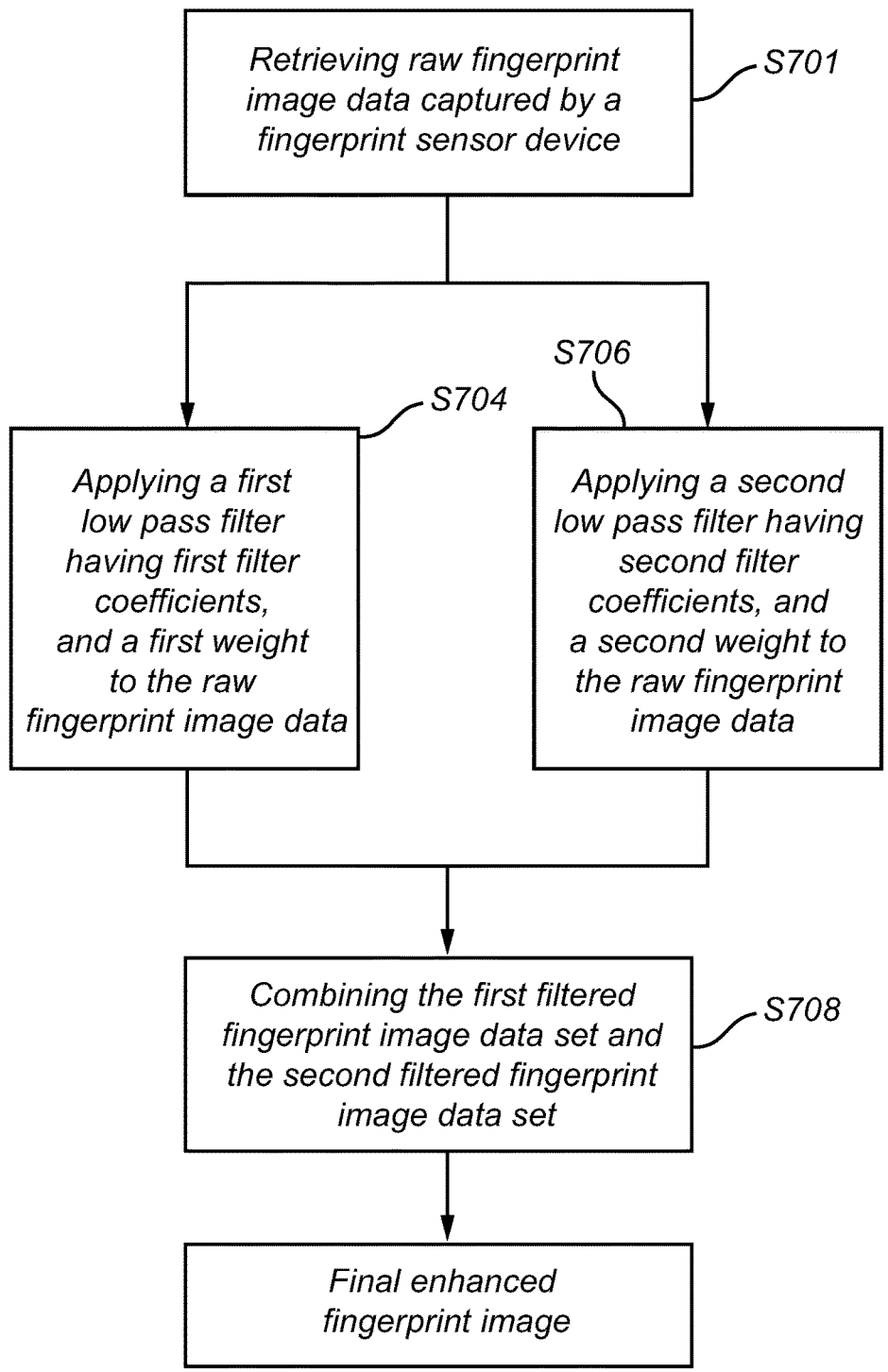
FIG. 7 is a flow-chart schematically illustrating a method according to an embodiment of the present invention.

FIG. 7 shows a flow-chart of method steps according to embodiments of the present invention disclosing a method for fingerprint image enhancement. In a first step S701 raw fingerprint image data captured by a fingerprint sensor device is retrieved.

In step S704 a first low pass filter and a first weight is applied to the raw fingerprint image data to produce a first filtered fingerprint image data set, the first low pass filter comprising at least one set of filter coefficients. For example, in embodiments where the low-pass filter is a Gaussian filter, the filter coefficients are selected to provide a desired standard deviation of the Gaussian distribution representing the Gaussian filter.

In step S706 a second low pass filter and a second weight is applied to the raw fingerprint image data to produce a second filtered fingerprint image data set. The second low pass filter comprises at least one set of filter coefficients, wherein the set of filter coefficients of the second filter different from the set of filter coefficients of the first filter.

Subsequently, in step S708 is the first filtered fingerprint image data set and the second filtered fingerprint image data set combined to produce a final enhanced fingerprint image.

Figure 8:
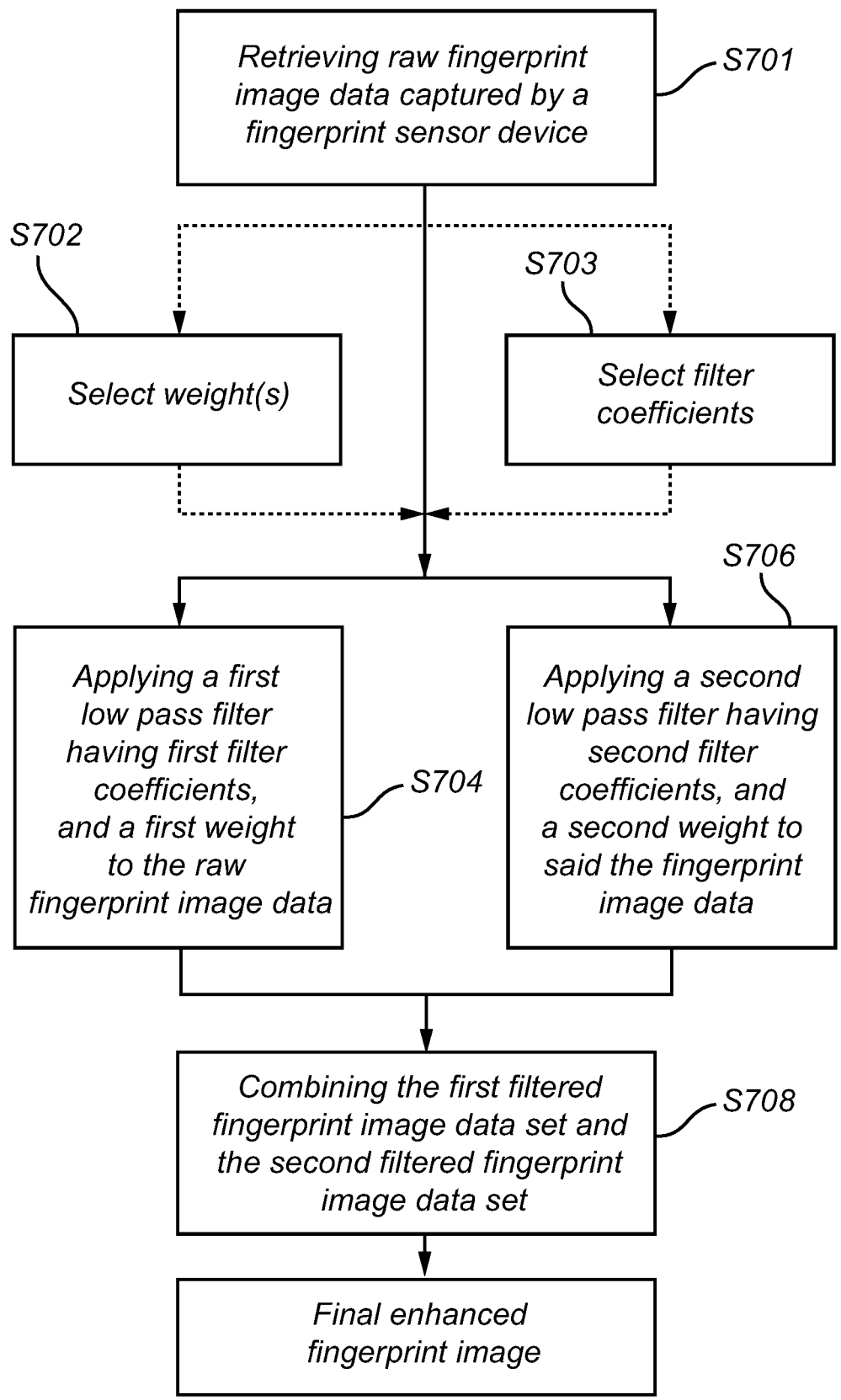
FIG. 8 is a flow-chart schematically illustrating a method according to an embodiment of the present invention.

Optionally, and now with reference to FIG. 8, there is included a step S702 to select the weights to be applied to the raw fingerprint image data. Further there is included an optional step S703 to select the filter coefficients for the low pass filters (e.g. the Gaussian filters).

The selection of filter coefficients and/or weights may be based on analyzing the raw fingerprint image data. For example, the selection may be done such as to obtain a sharpened final enhanced fingerprint image, or to obtain a more uniform final enhanced fingerprint image, or a combination of enhancements. Another approach is to optimize for biometric performance based on optimizing the trade-off between a false match rate and false non-match rate.

There are different procedures for determining which weights and/or filter coefficients to select. One way to learn about how to make such a selection is to perform off-line machine learning from previously captured raw fingerprint image data to learn how to change the raw fingerprint image data into a desired final enhanced fingerprint image. Thus, by analyzing a large amount of previous images and attempting to enhance the image by tweaking the filter coefficients and/or the weights, it may be possible to train the system to recognize how to change the input raw fingerprint image data into an enhance fingerprint image. This type of learning may for example be implemented using a supervised or unsupervised machine learning algorithm.

Figure 9:
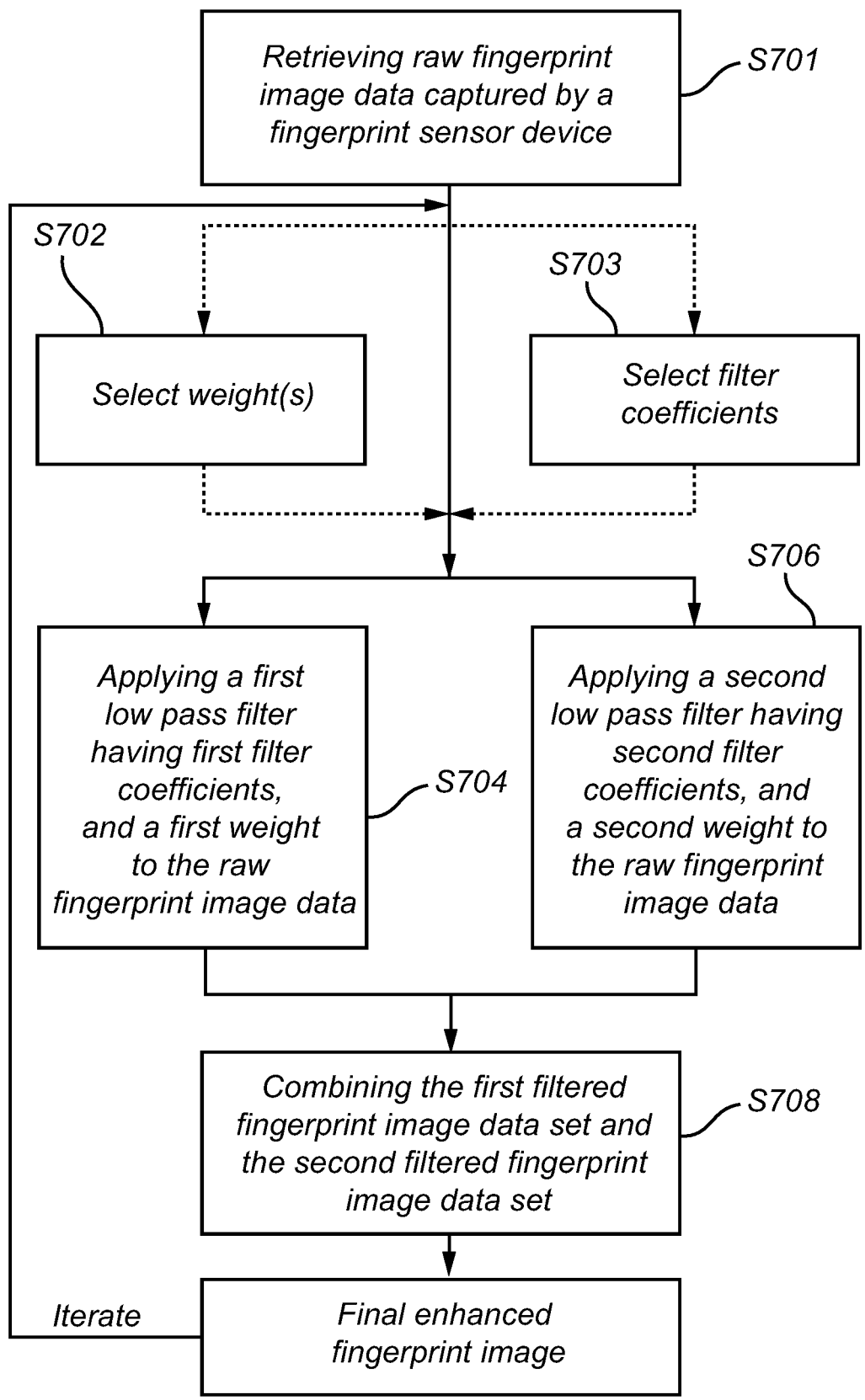
FIG. 9 is a flow-chart schematically illustrating a method according to an embodiment of the present invention.

FIG. 9 is a flow-chart of method steps according to another embodiment of the present invention. The steps of FIGS. 7 and 8 are included also in the embodiment in FIG. 9 and are not further described with reference to FIG. 9.

In FIG. 9 a schematic illustration of an iterative process for producing a final enhanced fingerprint image is presented. Accordingly, when a final enhanced fingerprint image has been produced in step S708, it is fed back as input to the filters, i.e. the final enhanced fingerprint image is passed through the filtering steps S704 and S706 with the optional steps of selecting a new filter coefficients and a new weight in steps S702 and S703 in each iteration. If the final enhanced fingerprint image is satisfactory after step S708, the process is ended and the final enhanced fingerprint image is output, otherwise the updated final enhanced fingerprint image is also fed back as input to step S704 and S706 with the optional steps S702 and S703.

The flow-charts in FIGS. 7-9 illustrate exemplary embodiments with two weights and two filters. As illustrated in FIGS. 4 and 5, the number of weights and filters may be any number and is of course not limited to two. For example the number of filters and weights may be 2, 3, 4, 5, 6, 7, 8, 9, 10, etc.

The functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for fingerprint image enhancement, the method comprising:
   retrieving raw fingerprint image data captured by a fingerprint sensor device;
   applying a first two-dimensional low pass filter and a first weight to the raw fingerprint image data to produce a first filtered fingerprint image data set, the first two-dimensional low pass filter comprising at least one set of filter coefficients,
   applying a second two-dimensional low pass filter and a second weight to the raw fingerprint image data to produce a second filtered fingerprint image data set, the second two-dimensional low pass filter comprising at least one set of filter coefficients, wherein the set of filter coefficients of the second filter is different from the set of filter coefficients of the first filter,
   combining the first filtered fingerprint image data set and the second filtered fingerprint image data set to produce a final enhanced fingerprint image.

2. The method according to claim 1, wherein the first weight is different from the second weight.

3. The method according to claim 1, comprising:
   applying a plurality of two-dimensional low pass filters and weights to the raw fingerprint image data to produce a plurality of filtered fingerprint image data sets, wherein the plurality of filtered fingerprint data sets are combined to produce the final enhanced fingerprint image.

4. The method according to claim 1, comprising:
   iteratively producing an updated final enhanced fingerprint image by repeating, for a multiple number of iterations, the applying of two-dimensional low pass filters and weights to the final enhanced fingerprint image produced in the respective previous iteration.

5. The method according to claim 4, wherein at least one of the sets of filter coefficients is varied between two iterations.

6. The method according to claim 4, wherein at least one of the weights is varied between two iterations.

7. The method according to claim 1, comprising:
   selecting the two-dimensional low pass filter coefficients based on properties of the retrieved fingerprint image data.

8. The method according to claim 1, comprising:
   selecting the weights for the filters based on the retrieved fingerprint image data.

9. The method according to claim 8, wherein the weights are selected for obtaining the final enhanced fingerprint image with improved sharpness.

10. The method according to claim 1, wherein each of the two-dimensional low pass filters is a respective Gaussian filter.

11. The method according to claim 10, wherein standard deviations of the Gaussian filters are different from each other, whereby the filter coefficients for the Gaussian filters are different from each other.

12. A fingerprint sensing system comprising:
    a fingerprint sensor device for acquiring fingerprint image data; and
    a control unit configured to perform the steps of claim 1.

13. The fingerprint sensing system according to claim 12, wherein the fingerprint sensor device is a capacitive fingerprint sensor.

14. An electronic device, comprising:
    a fingerprint sensing system according to claim 12;
    wherein the control unit is configured to:
    provide an authentication request for a finger to the fingerprint sensing device;
    receive an authentication signal from the fingerprint sensing device; and
    perform at least one action if the authentication signal indicates authentication success.

15. The electronic device according to claim 14, wherein the electronic device is a mobile device or a smart card.

16. Computer program product comprising a non-transitory computer readable medium having stored thereon computer program means for controlling an electronic device, the electronic device comprising a fingerprint sensor configured to acquire raw fingerprint image data, and a control unit configured to receive the raw fingerprint image data captured by the fingerprint sensor, wherein the computer program product comprises:
    code for applying a first two-dimensional low pass filter and a first weight to the raw fingerprint image data to produce a first filtered fingerprint image data set, the first two-dimensional low pass filter comprising at least one set of filter coefficients;
    code for applying a second two-dimensional low pass filter and a second weight to the raw fingerprint image data to produce a second filtered fingerprint image data set, the second two-dimensional low pass filter comprising at least one set of filter coefficients, wherein the set of filter coefficients of the second filter is different from the set of filter coefficients of the first filter, and
    code for combining the first filtered fingerprint image data set and the second filtered fingerprint image data set to produce a final enhanced fingerprint image.

* * * * *